United States Patent [19]

Stierman

[11] Patent Number: 5,212,261
[45] Date of Patent: May 18, 1993

[54] LATENT, HEAT-CURABLE EPOXY RESIN COMPOSITIONS CONTAINING METAL CARBOXYLATE CURING SYSTEMS

[75] Inventor: Thomas J. Stierman, Santa Rosa, Calif.

[73] Assignee: Henkel Research Corporation, Santa Rosa, Calif.

[21] Appl. No.: 628,794

[22] Filed: Dec. 17, 1990

[51] Int. Cl.$^5$ .................. C08G 59/68; C08L 63/00
[52] U.S. Cl. .................... 525/506; 528/90; 528/92; 528/93; 528/94; 528/95; 528/104; 528/109; 528/110; 528/111; 528/116; 528/117; 528/118; 528/119; 528/120; 528/322; 528/361; 528/358; 528/368; 528/225; 528/409; 528/413; 528/223; 528/222; 528/89; 525/58; 525/118; 525/482; 525/483; 525/484; 525/485; 525/486; 525/504; 525/505; 525/507; 525/523; 525/524; 525/525; 525/526; 525/533; 525/534

[58] Field of Search ............... 528/92, 361, 409, 413, 528/322, 95, 90, 111, 117; 525/506, 507, 508, 524, 525, 526

[56] References Cited

U.S. PATENT DOCUMENTS

| | | | |
|---|---|---|---|
| 3,117,099 | 1/1964 | Proops | 260/18 |
| 3,268,477 | 8/1966 | Mueler | 260/47 |
| 3,578,633 | 5/1971 | Gerd | 260/47 |
| 3,819,746 | 6/1974 | Katzakian | 260/930 |
| 3,838,101 | 9/1974 | Steele | 260/47 |
| 3,956,241 | 5/1976 | Steele | 260/47 |
| 3,962,182 | 6/1976 | Steele | 260/47 |
| 4,370,452 | 1/1983 | Heater | 525/438 |
| 4,604,452 | 8/1986 | Shimp | 528/422 |
| 4,605,581 | 8/1986 | Stevens | 428/96 |
| 4,608,434 | 8/1986 | Shimp | 582/422 |
| 4,614,674 | 9/1986 | Lauterbach | 427/386 |
| 4,829,124 | 5/1989 | Clark | 525/108 |

FOREIGN PATENT DOCUMENTS

| | | |
|---|---|---|
| 734939 | 2/1985 | Canada . |
| 1517867 | 3/1968 | France . |
| 49099600 | 3/1971 | Japan . |
| 50024396 | 3/1971 | Japan . |
| 60255820 | 10/1972 | Japan . |
| 51-21838 | 7/1976 | Japan . |
| 52-154899 | 12/1977 | Japan . |
| 63-4568 | 1/1988 | Japan . |
| 143594 | 2/1988 | Poland . |
| 6704695 | 4/1987 | South Africa . |

*Primary Examiner*—John C. Bleutge
*Assistant Examiner*—Frederick Krass
*Attorney, Agent, or Firm*—Ernest G. Szoke; Wayne C. Jaeschke; Real J. Grandmaison

[57] ABSTRACT

Latent, heat-curable epoxy resin compositions containing metal carboxylate curing systems provide exceptional latency, particularly at elevated temperature, as well as facile curing, high $T_g$ and adhesive strength, and other attractive properties. The metal carboxylates comprise alkali metals and alkaline earth metals, aromatic and aliphatic metal carboxylates. The preferred curing systems comprise synergistic combinations of the metal carboxylates with cure modifiers.

51 Claims, No Drawings

LATENT, HEAT-CURABLE EPOXY RESIN COMPOSITIONS CONTAINING METAL CARBOXYLATE CURING SYSTEMS

BACKGROUND OF THE INVENTION

1. Field of the Invention

This invention relates generally to epoxy resin compositions, and more particularly, to heat-curable epoxy resin compositions containing metal carboxylate curing systems which are capable of providing exceptional latency, particularly at elevated temperatures, as well as attractive cure rates, high $T_g$ and adhesive strength, and other attractive cured properties.

2. Discussion of Related Art

Epoxy resins are important commercial products which can be cured to form insoluble, infusible films, pottings, castings, adhesives, laminates, composites, and the like. When cured, they are markedly superior in their physical, chemical, and electrical properties to many other cured thermosetting resins. They exhibit low shrinkage during curing. The combination of hardness and toughness exhibited by the cured resins, their high adhesive strength, resistance to degradation by solvents and other chemicals and their electrical properties, such as dielectric constant and resistivity, are outstanding. At the same time, these properties can be varied within wide limits depending on the end use intended for the resin. Of the wide variety of hardeners, curing agents, or homopolymerization catalysts which have been used to cure polyepoxide resins, no one is suitable for all applications, and many have serious drawbacks no matter what the application.

One-part epoxy formulations, in which the epoxy resin and curing agent are stored together, are desirable for a number of reasons. Such formulations are much more convenient to use, since no mixing is required, and can also provide improved reproducibility of results through better control of stoichiometry. An additional disadvantage of two-part formulations is their short life-time, and the fact that once mixed, they must be used or discarded.

One-part thermosetting epoxy compositions, with good storage stability at room temperature and rapidly curable at elevated temperatures are well known. Many examples, however, utilize relatively expensive curing agents. Further, relatively few are capable of providing latency at elevated temperatures. Recently, the desire for latent curing agents having enhanced stability at elevated temperatures has increased. In many application areas, efforts to provide high solids epoxy formulations with low levels of volatile organic compounds often result in increased viscosity and more difficult processing. Elevated temperatures can be used to reduce viscosity and improve processibility in thermosetting epoxy compositions, however, adequate pot-life must still be maintained. Further, facile reaction at reasonable curing temperatures is also desired. For example, a crosslinkable hot-melt adhesive would require formulation stability at an elevated application temperature, but ideally could be cured at some slightly higher temperature. Thus, the desire for latency at elevated temperatures, while maintaining facile reactivity without having to go to excessively high temperatures, is placing increasingly more difficult demands on latent epoxy curing agents.

Among the curing agents for epoxy resins are those categorized as either catalytic or coreactive. Catalytic curing agents initiate resin homopolymerization, either cationic or anionic, as a consequence of using a Lewis acid or base in the curing process.

Lewis bases, such as tertiary amines, are usually employed as accelerators for other curing agents. The utility of Lewis bases for catalytic curing of polyepoxides is limited due to long cure times at high temperatures, short pot-life, and resultant relatively poor properties. Imidazoles are unique among the Lewis bases, since they are capable of providing facile curing at moderate temperatures as well as attractive properties. Their reactivity, however, tends to impart relatively poor stability to one part epoxy formulations. This is especially true when stability at elevated temperatures is required The Lewis acid catalysts frequently employed are complexes of boron trifluoride or boron trichloride with amines or ethers. Although these complexes are capable of providing attractive latency and reactivity, they are not suitable for all applications. For example, in some applications undesirable corrosion can result.

Coreactive curing agents are polyfunctional reagents that are employed in approximately stoichiometric quantities with epoxy resins and possess active hydrogen atoms. The important classes include polyamines, polyaminoamides, polyphenols, polymeric thiols, polycarboxylic acids, and anhydrides.

Dicyandiamide is one of the most commonly employed latent epoxy curing agents. As a solid curing agent, dicyandiamide's attractive latency is due to its insolubility in epoxy resins. While it can be used alone, for improved performance dicyandiamide is generally used in combination with accelerators (e.g. ureas and imidazoles). Dicyandiamide provides one-part epoxy formulations with long term stability at room temperature and also good stability at elevated temperatures. While dicyandiamide represents the current state of the art in commercial latent curing systems, certain embodiments of the present invention can provide even better latency at high temperatures, and yet give more rapid curing at slightly higher temperatures. In other words, the temperature difference between maximum stable pot temperature and minimum cure temperature is smaller for certain embodiments of the present invention, thus providing an improved latency/reactivity profile.

In the prior art, U.S. Pat. No. 4,829,124 describes the preparation of a thermoplastic elastomer comprising a blend of (a) a carboxylated butadiene-acrylonitrile elastomer and (b) an ethylene/acrylic acid copolymer which has been partially neutralized with a metal ion, wherein the blend of (a) and (b) are dynamically cross-linked with a small amount of an epoxy having at least 2 epoxy moieties per molecule. Being thermoplastic, the product can be melted repeatedly.

U.S. Pat. No. 4,614,674 relates to the addition of a wax or wax-like substance in conjunction with divalent or trivalent metal salts or metal complexes of organic compounds as matting agents to powder coating compositions based on epoxy resins and carboxyl-terminated polyesters. Such is reported to provide a matting effect without impairing other properties of the coating composition.

U.S. Pat. No. 4,411,955 is directed to a reactive hardenable binder composition based on a polyepoxide, a polycarboxylic acid unit based on a polymeric product, and a catalyst component in the form of an alkali and/or alkaline earth metal salt of a polymeric carboxylic acid. These systems are not latent, but cure at room temperature upon mixing. U.S. Pat. No. 4,370,452 teaches a process for inducing the rapid curing of a copolyester resin, wherein the copolyester resin is reacted with a curing reaction catalyst during polymerization of the copolyester resin to activate carboxyl termini thereof prior to final compounding the material with an epoxide compound. The curing reaction catalyst is selected from quaternary ammonium halides, tertiary amines, and carboxylate salts of group I and group II metals, Fe, Sn, and Co.

U.S. Pat. No. 4,240,938 is directed to a water-soluble reactive binder mixture comprising a halogen-free polymeric carboxylic acid compound; a salt-forming substance selected from an alkali metal, alkaline earth metal and quaternary ammonium salts, organic bases and ammonia; and a polymer containing hydroxyl groups or an epoxide compound. The mixtures are very reactive, i.e., even at 0° C. they undergo hardening by cross-linking.

U.S. Pat. No. 4,152,284 discloses an accelerator combination for the cross-linking of powder paints containing an acrylic resin having carboxyl groups and an epoxy resin, the accelerator consisting essentially of (a) a compound of the formula LiX wherein X represents a hydroxyl ion, the anion of hydrochloric acid, hydrobromic acid, or of a carboxylic acid, and (b) a quaternary ammonium compound.

U.S. Pat. No. 3,622,442 relates to non-woven fibrous webs which are bonded using an aqueous dispersion of a copolymer of ethylene and unsaturated carboxylic acid wherein 0% to 75% of the acid groups have been neutralized with alkali metal ions, said copolymer being cross-linked with an epoxy resin or an amino-formaldehyde resin. Once the dispersion is dried, curing proceeds at room temperature.

U.S. Pat. No. 3,268,477 is directed to a process for curing polyepoxides with polycarboxylic acids in the presence of a small amount of an oxide of a metal of Groups 2a and 2b of the Periodic Table of Elements, for example, magnesium oxide.

Japan 63-4,568 (equiv. to 57-111,315) discloses a non-hardening epoxy resin composition containing at least one epoxy group per molecule, a compound containing at least two alcoholic hydroxy groups per molecule, a metal salt of a Lewis acid, and an inorganic filler having an average diameter of 0.5-10 microns. The metals described are di/trivalent metals. Curing to a hardened product is not described. Attempts to harden Epon 828 epoxy resin using the magnesium sulfate curing agent of Example 1 with ethylene glycol were unsuccessful at their conditions of 120° C. for 4 hours, as well as at 180° C. for 30 minutes.

Japan 51-21,838 (equiv. to 50-1,198) discloses an epoxy resin composition blended with a hardener and an organic carboxylic acid salt of Mg, Al, Cd, Cr, Mn, Co, Ni, or Cu, agitated at 70°-150° C. to provide a liquid product having excellent storage stability and improved properties when hardened. Although the text is ambiguous, the hardener is stated to be the aliphatic carboxylic acid corresponding to the metal salt carboxylate.

In U.S. Pat. Nos. 4,608,434 and 4,604,452, polycyanate esters are cured by transition metal carboxylates dissolved in monohydric alcohols or alkylphenols.

Japan 50-024,396, Japan 49-099,600, Canada 734,939, France 1,517,867, U.S. Pat. No. 4,605,581, and U.S. Pat. No. 3,117,099 describe the use of transition metal carboxylates to cure epoxy resins.

The use of alkali metal or alkaline earth metal carboxylates to catalyze the curing of epoxy resins by carboxylic anhydrides is described in Poland 143,594, Japan 60-255,820, Japan 52-154,899, U.S. Pat. No. 3,578,633 and South Africa 67-04,695.

The use of chromium carboxylates to catalyze the curing of epoxy resins by imides is described in U.S. Pat. Nos. 3,962,182, 3,956,241, 3,838,101 and 3,819,746.

None of the above prior art, however, teaches or discloses the improved curing systems of this invention. In the chapter entitled "Curing Agents and Modifiers", pp. 465-550 in Epoxy Resins Chemistry and Technology, $2^{nd}$ Edition, edited by C. A. May, Marcel Dekker, Inc., New York, 1988, Mika and Bauer discuss tertiary amines, metal alkoxides, quanidines, imidazoles, and other anionic initiators for epoxy curing, but do not even refer to metal carboxylates for this purpose. On p. 493, the authors teach that the cure of epoxy resins by polymerization with anionic initiators has not found wide commercial acceptance because long cure cycles are required and because the resultant cures have a low heat-distortion point ($T_g$). Contrary to this teaching, the exceptional latency, facile curing, and excellent cured properties provided by the epoxy compositions of this invention, using the alkali and alkaline earth metal carboxylate curing systems herein described, is unexpected and surprising.

SUMMARY OF THE INVENTION

Other than in the operating examples, or where otherwise indicated, all numbers expressing quantities of ingredients or reaction conditions used herein are to be understood as modified in all instances by the term "about".

It has now been found that alkali metal or alkaline earth metal carboxylates, used alone or in synergistic combination with cure modifiers, are outstanding curing agents for epoxy resins. Epoxy resin compositions containing these novel combinations of alkali metal or alkaline earth metal carboxylates with cure modifiers have been found to provide exceptional latency, unexpectedly facile curing, and attractive properties after curing. In some cases, attractive performance can also be obtained in the absence of added cure modifiers, i.e., with certain metal carboxylates and/or certain epoxy resins.

Thus, the metal carboxylate curing systems of this invention are capable of providing increased latency at elevated temperatures as well as allowing an enhanced cure rate at higher temperatures. Further, attractive properties, such as $T_g$ and adhesive strength, are obtained with the use of said metal carboxylate curing systems when cured under relatively mild conditions. Accordingly, many of the disadvantages noted above for existing epoxy curing agents, have been overcome. These results are surprising, especially in light of the prior art describing the general lack of utility of anionic epoxide homopolymerization catalysts, and form the basis for this invention.

DETAILED DESCRIPTION OF THE INVENTION

This invention relates to specific heat-curable epoxy resin compositions, and the use of metal carboxylate curing systems therefor. The compositions typically comprise a blend of alkali metal or alkaline earth metal carboxylate, cure modifier and epoxy resin. In some specific cases, however, a cure modifier may not be required in the epoxy resin composition.

In accordance with this invention, it is possible to tailor the performance of epoxy resin compositions over a broad range by variation of the (a) metal carboxylate structure, (b) cure modifier structure, (c) epoxy resin structure, (d) other additives present, and (e) relative amounts of each component utilized. Such heat-curable epoxy resin compositions are capable of providing a number of desirable performance advantages when formulated as described herein. These advantages include (a) superior latency at elevated temperatures, e.g., up to about 80° C. or even higher, (b) enhanced reactivity at lower curing temperatures. e.g., from about 100°–180° C., (c) exceptional heat resistance, i.e., $T_g$'s up to the 200° C. range, and (d) good adhesive strength.

The heat-curable epoxy resin compositions of this invention may be used in a wide variety of applications, including the general areas of adhesives, composites and coatings. Specific applications of particular interest include (1) cross-linkable epoxy hot-melt adhesives, (2) heat-resistant epoxy adhesives, (3) epoxy electrical laminates for printed circuit boards, and (4) epoxy powder coatings.

The alkali metal and alkaline earth metal carboxylate salts of this invention are those salts of metals of group IA and IIA of the Periodic Table of Elements which are substantially insoluble in the curable epoxy resin formulation at room temperature, but are substantially soluble at curing temperatures of from about 100° to about 50° C. Preferred salts are those of lithium, sodium, potassium, and calcium. The organic portion of the salt may be either aliphatic or aromatic, substituted or unsubstituted, or may contain heteratoms, and may contain from one to four carboxyl groups. Preferred salts are derived from carboxylic acids containing one or two carboxyl groups, and the most preferred salts are derived from carboxylic acids containing one carboxyl group. Since the carboxylate anion must be a good nucleophile, the carboxylic acid corresponding to the carboxylate salt must not be too strongly acidic; the $pK_a$ should be above about 3. The metal carboxylate salts may be used, individually or as mixtures thereof at concentrations of from about 0.1 to about 50 parts by weight per hundred parts by weight of total epoxides in the formulation. The preferred concentration is from 1 to about 10 parts by weight per hundred parts by weight of total epoxide. The preferred metal carboxylates for use herein are the carboxylates of lithium, sodium, potassium, and calcium derived from carboxylic acids containing 1 carboxyl group. Examples of preferred salts include, but are not limited to, lithium benzoate, sodium benzoate, potassium benzoate, calcium benzoate, sodium oleate, sodium 4-hydroxybutyrate, sodium formate, sodium acetate, sodium m-nitrobenzoate, sodium p-chlorobenzoate, sodium p-hydroxybenzoate, sodium salicylate, sodium p-methoxybenzoate and disodium t-butylisophthalate. Sodium benzoate is one of the most preferred catalysts. Other examples of metal carboxylates include calcium acetate, potassium acetate, and sodium propionate.

Although not desiring to be bound or limited by any postulation, it is believed that the metal carboxylate salt functions as a latent anionic curing initiator. That is, at low temperatures the curing initiator is present as an insoluble solid in the epoxy resin and thus no curing occurs. At elevated temperatures, where certain polyepoxides are present, the metal carboxylate initiator can dissolve and lead to the initiation of facile curing of the epoxide. Thus, it is believed that in order for facile curing of the epoxy resin to occur, at least a substantial portion of the metal carboxylate salt present in the composition must become dissolved in the epoxy phase at the cure temperature. That is, a curing-effective portion of the metal carboxylate salt must be in the same phase as the epoxy resin at the cure temperature for the curing reaction to take place. In specific cases, this occurs without the addition of a cure modifier.

However, it has also been found that a variety of compounds are useful as cure modifiers and are effective for enhancing the solubility of the ionic metal carboxylate in the epoxy composition since many epoxy resins are relatively non-polar materials. These compounds contain polar functionalities and are believed to increase the solubility of the metal carboxylate in the epoxy resin at curing temperatures. The cure modifier itself may be either soluble or insoluble in the epoxy resin at room temperature, but must be soluble in effective amounts at the cure temperature. Generally, it has been found that if the cure modifier is insoluble in the epoxy resin at the curing temperature, it does not function as such. The use of cure modifiers which are insoluble in the epoxy resin at temperatures below the desired cure temperature, however, can provide enhanced latency, since the effect of the cure modifier is not observed until it dissolves in the epoxy resin component.

It is believed that effective cure modifiers herein are those which enhance the solubility of the metal carboxylate salt at the cure temperature of the epoxy resin. Accordingly, to be effective, the cure modifier must be sufficiently polar so that at the concentration it is present, the polarity of the epoxy composition is increased to the point that a curing-effective amount of the metal carboxylate salt becomes dissolved at the cure temperature. For very polar cure modifiers, or those with high solvating strength, only a relatively small amount thereof may be required for this to occur. For cure modifiers with lower solvating strength or polarity, higher levels would need to be present to increase the solvating ability of the overall epoxy composition to a level providing solubilization of curing-effective amounts of the metal carboxylate.

Furthermore, for a metal carboxylate salt which is more easily dissolved, the requirements for an effective cure modifier are less stringent. Conversely, for a very polar, insoluble metal carboxylate salt, a more polar, stronger solvating cure modifier would be required. Thus, the cure modifier and metal carboxylate salt can be matched accordingly to allow curing in a given epoxy formulation.

It has also been found that although a high polarity cure modifier is generally useful, it has been determined that materials which are too high in polarity may be ineffective as cure modifiers. This is believed to be due to their own limited solubility in the epoxy resin phase. Thus, although such materials may dissolve the metal carboxylate salt, curing-effective amounts of the metal carboxylate do not become dissolved in the epoxy resin phase because of the immiscibility between the epoxy resin phase and the metal carboxylate-cure modifier phase. Accordingly, the range of effective cure modifiers apparently falls within a range of polarity which excludes both materials having very low polarities as well as those having extremely high polarities.

Pursuant to the foregoing, useful cure modifiers herein must meet the following requirements: (1) they must have a minimum polarity such that they promote the solubilization of curing-effective amounts of the metal carboxylate salt into the epoxy resin phase, and (2) they must not be so polar that they have low solubility in the epoxy resin phase. Thus, the controlling factor with regard to the cure modifier is its ability to promote solubilization of the metal carboxylate salt in the epoxy resin phase. Although its polarity and dielectric constant are important, additional factors also contribute to its solubilizing and cure promoting ability, for example, its electron pair donicity, the relative geometries of heteroatoms, crystal matrix interactions, hydrogen bond donating and accepting ability, and the like. To be effective as a cure modifier, a compound must exceed the epoxy resin component in its metal carboxylate solubilizing ability. In general, cure modifiers having very high solubilizing ability will provide more reactive, less latent compositions, while those having lower solubilizing ability will provide less reactive, more latent compositions.

As indicated earlier herein, the ability to match an epoxy resin, a metal carboxylate salt, and a cure modifier, when present, which is essential for facile curing to be accomplished, is of utility in tailoring the performance of metal carboxylate salt curing systems for specific applications. For example, to obtain a composition having high latency, one can choose a less soluble metal carboxylate salt and a less powerful cure modifier. In such case, solubilization and subsequent curing of the epoxy composition would only take place at high temperatures. Alternatively, for an application requiring greater reactivity, one would choose a more soluble metal carboxylate salt as well as a cure modifier with greater solvating ability. In each case, the specific choices would be dependent upon the latency required as well as the reactivity required at some higher temperature. This ability to tailor formulation latency and reactivity, together with facile curing, constitutes major advantages for these curing systems over prior art curing systems. For example, the use of dimethyldistearylammonium chloride with sodium benzoate results in curing at about 115° C., and would be of interest in applications where lower cure temperatures are desired, and latency at elevated temperature is not needed. In applications where latency is required at high temperatures, a less powerful cure modifier such as N-(2-methoxyethyl)-benzamide will provide curing at about 220° C. with sodium benzoate, and will be latent at high temperatures. Through optimization of the cure modifier/metal carboxylate combination, exceptional latency can be obtained at temperatures only slightly lower than those required for facile curing, such as observed with the combination of sodium benzoate and N,N'-diethanol isophthalamide ("H-Iso"). The modifier "H-Iso" provides particularly small differences between maximum stable pot temperature and minimum cure temperature, at least in part because "H-Iso" is an insoluble solid in bisphenol A-diglycidyl ether epoxy resin (Epon 828) up to relatively high temperatures, such as about 100° C. Since it is a powerful solubilizing agent, facile curing occurs upon melting and dissolution, above about 125° C.

More specifically, in accordance with this invention, compounds containing the following functional groups or combinations thereof have been found to provide useful curing in the presence of metal carboxylates: alcohols, amides, imides, oximes, phenols, sulfonamides, lactones, ethers, sulfones, sulfoxides, cyanate esters, quaternary ammonium and phosphonium compounds. While not required, it is possible that some of these cure modifiers may also coreact with the epoxy resin during the curing process. This is particularly true for those cure modifiers containing active hydrogens such as phenols or alcohols, as well as for those containing base-sensitive functionality such as lactones. For the purposes of this invention, epoxy curing agents of the prior art containing functional groups such as amines, carboxylic acids or carboxylic anhydrides are not considered cure modifiers, although they may be present in less than cure-effective amounts. Cure effective amounts are those amounts of the afore-mentioned epoxy curing agents known to provide good curing of epoxy resins to hardened products; generally, from about 0.5 equivalents to greater than 1 equivalents per equivalent of epoxide.

The attractive curing utility of combinations of alkali or alkaline earth metal carboxylates with materials generally considered to be unreactive toward epoxide (e.g. alcohols, amides) is not taught and is surprising. Further, the prior art does not teach the use of alkali or alkaline earth metal carboxylates with other epoxy curing agents such as phenols and imides. Surprisingly, it has been found that the use of the afore-mentioned metal carboxylates with phenols and imides is particularly attractive.

As previously indicated herein, compounds containing polar functional groups are useful as cure modifiers. In more detail, preferred cure modifiers herein are amide-alcohols containing amide and alcohol functionality. Preferred amide-alcohols are those of the general structural formula (1)

$$R_1-[-C(O)-NH_m-(R_2-OH)_{2-m}]_n \qquad (1)$$

wherein $R_1$ represents (a) an aliphatic, cycloaliphatic, aromatic, or araliphatic group, which may be substituted or unsubstituted, and which may or may not contain heteroatoms, or (b) a single bond; $R_2$ represents a divalent aliphatic group, which may be substituted or unsubstituted, and which may or may not contain heteroatoms; m may be 0 or 1; and n may be 1 or 2.

More preferred amide-alcohols are those of formula (1) wherein $R_2$ is the group $-CR_3R_4-CR_5R_6-$; and $R_3$, $R_4$, $R_5$ and $R_6$ may be the same or different, and may represent hydrogen, alkyl, or hydroxyalkyl groups. Other more preferred amide-alcohols are those of formula (1) wherein $R_2$ is selected from $-CH_2CH_2-$, $-C(CH_3)_2CH_2-$, $-C(CH_2CH_3)(CH_2OH)CH_2-$, $-C(CH_2OH)_2CH_2-$, $-CH(CH_2CH_3)CH_2-$, $-CH_2CH(CH_3)-$, $-CH_2CH(CH_2CH_3)-$, $-CH_2CH_2CH_2-$, $-CH_2CH_2CH_2CH_2-$, and $-CH_2CH_2(OCH_2CH_2)_x-$, where x may be from 1 to about 10.

Within the scope of general formula (1) the following structures provide particularly good results:
(1a) $R_1=$1,2-substituted-benzene, $R_2=-CH_2CH_2-$, m=1, and n=2;
(1b) $R_1=$1,2-substituted-benzene, $R_2=-C(CH_3)_2CH_2-$, m=1, and n=2;
(1c) $R_1=$1,3-substituted-benzene, $R_2=-CH_2CH_2-$, m=1, and n=2;
(1d) $R_1=$1,3-substituted-benzene, $R_2=-C(CH_3)_2CH_2-$, m=1, and n=2;

(1e) $R_1$=1,4-substituted-benzene, $R_2$=—CH$_2$CH$_2$—, m=1, and n=2;
(1f) $R_1$=1,4-substituted-benzene, $R_2$=—C(CH$_3$)$_2$CH$_2$—, m=1, and n=2;
(1g) $R_1$=phenyl, $R_2$=—CH$_2$CH$_2$—, m=1, and n=1;
(1h) $R_1$=phenyl, $R_2$=—C(CH$_3$)$_2$CH$_2$—, m=1, and n=1;
(1i) $R_1$=—CH$_2$CH$_2$CH$_2$CH$_2$—, $R_2$=—CH$_2$CH$_2$—, m=0, and n=2;
(1j) $R_1$=1,3 substituted-benzene, $R_2$=—CH$_2$CH$_2$—, m=0, and n=2;
(1k) $R_1$=phenyl, $R_2$=—CH$_2$CH$_2$—, m=0, and n=1.

Examples of preferred structures of the foregoing secondary amide-alcohols are as follows:

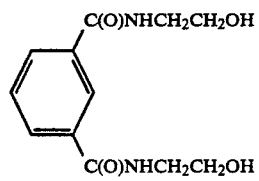

N,N'-diethanol isophthalamide (H—Iso)

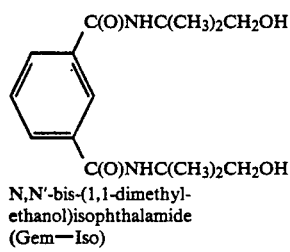

N,N'-bis-(1,1-dimethyl-ethanol)isophthalamide (Gem—Iso)

Other amide-alcohol cure modifiers include the reaction products of 4-hydroxyacetanilide with either epoxyphenoxypropane or the diepoxide of vinylcyclohexene. These cure modifiers provide high polarity and hydrogen bonding capacity. In principle, a broad range of metal carboxylates employed with the afore-mentioned amide-alcohols may provide attractive cured properties.

Alcohols which are acceptable as cure modifiers herein are those which are soluble in the epoxy resin matrix at the desired cure temperature. Examples of acceptable alcohols include: the mono-ols benzyl alcohol, 1-decanol, 2-decanol; the diols ethylene glycol, propylene glycol, 1,4-benzenedimethanol, 1,6-hexanediol, 2,2-dimethyl-1,3-propanediol, 2,5-hexanediol, 1,4-cyclohexanediol; and the polyols polyvinyl alcohol, and phenoxy resin. Phenoxy resins are thermoplastic polyether-polyols produced by reaction of a bisphenol with epichlorohydrin and are of higher molecular weight than the similar bisphenol A based epoxy resins. Other examples of alcohol cure modifiers include the ether-alcohols hydroquinone bis-(2-hydroxyethyl)ether, diethylene glycol, triethylene glycol, tetraethylene glycol, dipropylene glycol, tripropylene glycol, and their mono-methyl, -ethyl, and -butyl ethers, and the mono-methyl, -ethyl, and -butyl ethers of ethylene glycol and propylene glycol; the mono-ols 2-ethylhexanol, octanol, isooctanol, isononanol, dodecanol, tridecanol, hexadecanol, octadecanol; and the di-ol 1,4-butanediol. Glycerol is substantially insoluble in a bisphenol A-diglycidyl ether based epoxy resin composition at temperatures of 100° C. to 180° C., and thus is not considered a cure modifier with this particular epoxy resin.

Examples of amides which are acceptable as cure modifiers herein include benzamide, N-butylbenzamide, and N-methyl-N-butylbenzamide. Other examples of amide cure modifiers include acetamide, N-methylacetamide, cyanoacetamide, acetanilide, benzanilide, acrylamide, caprolactam, diethyltoluamide, formamide, nicotinamide, salicylamide, dimethylformamide, dimethylacetamide, 2-pyrrolidinone, N-methyl-2-pyrrolidinone, N-vinyl-2-pyrrolidinone, and 5,5-dimethylhydantoin. Examples of sulfonamide cure modifiers include benzenesulfonamide and p-toluenesulfonamide.

Examples of imides which are acceptable as cure modifiers herein include succinimide, phthalimide, tetrahydrophthalimide, oxy-diphthalimide, and hexafluoroisopropylidene-diphthalimide. Examples of oximes which are acceptable as cure modifiers herein include 5-dodecylsalicylaldoxime and 5-nonyl-2-hydroxyacetophenoxime.

Examples of phenols which are acceptable cure modifiers herein include catechol, 4-t-butylphenol, 4-nitrophenol, bisphenol A, bisphenol S, 1,5-dihydroxyanthraquinone, and phenolic resins such as novolacs and resoles. Other examples of phenolic cure modifiers include phenol, o-nitrophenol, acetaminophen, hydroquinone, p-methoxyphenol, eugenol, resorcinol, cresols, o- and p-phenylphenol, 2,6-di-tert-butyl-p-cresol, p-tert-amylphenol, octylphenol, nonylphenol, and dodecylphenol.

Examples of lactones which are acceptable cure modifiers herein include γ-butyrolactone and ε-caprolactone. Examples of acceptable ethers herein are 18-crown-6 ether, dibenzo-18-crown-6 ether, tetraethylene glycol dimethyl ether, and poly(ethylene glycol) ether.

Examples of sulfones and sulfoxides which are acceptable cure modifiers herein include dimethyl sulfone, tetramethylene sulfone, bis-(phenylsulfonyl)methane, and dimethyl sulfoxide.

Examples of suitable quaternary ammonium compounds include (2-hydroxyethyl)trimethyl-ammonium chloride and dimethyldistearylammonium chloride. Examples of suitable quaternary phosphonium compounds include tetrabutylphosphonium bromide.

Examples of cyanate esters which are acceptable cure modifiers herein include the poly-cyanate esters of bisphenol A, tetramethylbisphenol F, thiodiphenol, hexaflourobisphenol A, bisphenol E, dicyclopentadienephenol condensates, and their partially trimerized blends.

The synergistic combinations of alkali metal or alkaline earth metal carboxylates with cure modifiers, in the preferred compositions of this invention, have been found to provide unexpectedly facile curing of epoxy formulations, as well as attractive final properties. Use of cure modifiers alone (in the absence of the metal carboxylates) is generally ineffective; that is, facile curing does not occur. Use of the metal carboxylates alone (in the absence of cure modifiers) has, in general, been observed to result in substantially slower cure rates as well as less desirable final properties.

In some cases, however, compositions comprising certain metal carboxylates or certain epoxy resins, in the absence of added cure modifiers, may also be of utility. During the experimental work herein, it was noted that some metal carboxylates are capable of curing bisphenol A-diglycidyl ether resins in the absence of a cure modifier. Although generally not quite as attractive as that obtained with a cure modifier, the level of performance observed can still be attractive. Similarly, during evaluation of a variety of epoxy resins, it was noted that certain epoxy resins such as triglycidyl-p-aminophenol (available from Ciba-Geigy under the trademame MY 0510) and flexibilized bisphenol A epoxy (available from Ciba-Geigy under the tradename XB 4122) may promote solubilization of alkali metal and alkaline earth metal carboxylates and, therefore, allow the formulation of useful compositions which do not include added cure modifiers. These epoxy resins were capable of being cured with a carboxylate salt such as sodium benzoate in the absence of a cure modifier. Again, although some aspects of performance may be compromised in such formulations, the level of performance obtainable can be attractive. In general, however, superior final properties such as glass transition temperature ($T_g$) and lap shear strength (LSS), a measure of adhesive strength, are obtained using synergistic combinations of alkali metal or alkaline earth metal carboxylates with one or more of the afore-mentioned cure modifiers.

The relative amounts of each of the main components herein, required to give attractive performance, is from about 0.1 to about 50 parts, preferably from about 1 to about 10 parts of metal carboxylate per hundred parts (phr) of total epoxy resin, while the amount of cure modifier may be from zero to about 100 parts per hundred parts of total epoxy resin, preferably from about 1 to about 100 parts of cure modifier, and more preferably from about 1 to about 50 parts of cure modifier, and still more preferably from about 1 to about 20 parts of cure modifier, all parts given being on a weight basis. Amounts outside these given ranges may, however, also be of interest. As with the metal carboxylate salts, the cure modifiers herein may be used individually or as mixtures of said cure modifiers. For purposes of calculation, said epoxy resin includes the amount of polyepoxide plus any amount of monofunctional epoxy reactive diluent which may be present.

The epoxy resin employed with the curing systems of this invention can be any anionically polymerizable epoxy resin. In common practice, glycidyl type epoxy resins are of general utility. Attractive performance can be obtained over a range of functionalities, including monofunctional, difunctional, and polyfunctional.

Examples of commercial products within this class include: bisphenol A based epoxy resins (solid and liquid), epoxy novolacs, brominated epoxy resins, epoxy diluents, and multifunctional epoxy resins such as triglycidyl p-aminophenol and tetraglycidyl methylene dianiline. Cycloaliphatic epoxies, containing only epoxy rings which bear more than one substituent and which are typically cured with anhydrides or cationically, have not been observed to provide attractive curing with the curing systems herein.

The most widely used epoxy resins are diglycidyl ethers of bisphenol A derived from bisphenol A and epichlorohydrin as illustrated in the following structural formula.

In addition to bisphenol A, other polyols such as aliphatic glycols and novolacs are used to produce specialty resins. Aromatic amines and aminophenols are also commonly converted to polyglycidyl derivatives. Examples would include the triglycidyl derivative of meta and para aminophenol and the tetraglycidyl derivative of methylene dianiline. Such epoxy resins range from low viscosity liquids to solid resins.

Novolac resins are produced by reaction of formaldehyde with a phenol, for example, phenol, alkyl, aryl or polyhydroxy phenols. The resulting polyglycidyl ethers are then prepared by reaction of an epihalohydrin, usually epichlorohydrin, with the novolac. A useful molecular weight range for the novolacs is from about 300 to 1,000.

Further, useful polyepoxides are glycidyl ethers from polyhydric alcohols such as butanediol, glycerine, pentaerythritol, 1,2,6-hexanetriol and trimethylolpropane; glycidyl esters such as diepoxides prepared from phthalic acid, tetrahydrophthalic acid, hexahydrophthalic acid and dimer acids.

Polyepoxide compositions containing the novel curing agents of the present invention can also contain fillers, extenders, solvents, thixotropes, pigments, flame retardants, release agents, rubber tougheners, reactive diluents, plasticizers, antiplasticizers, flexibilizers, fibers in the form of unidirectional strands and mats, swirled mats, woven cloth, and chopped fibers, and the like. It should be noted that care must be exercised when using ancillary materials since such may affect the latency, reactivity, and performance aspects other than those intended.

Reactive diluents and other such modifiers are optional and are primarily used to adjust viscosity and/or introduce flexibility to the cured resin/hardener. Examples of reactive monofunctional epoxy diluents are butyl glycidyl ether, cresyl glycidyl ether, Epoxide 8 ($C_{12}$-$C_{14}$ glycidyl ethers), and Cardura E10 (glycidyl ester).

When curing epoxy resins, the resins, a metal carboxylate, and optionally a cure modifier, are brought together and blended by simple mixing. Mild heating may be used to aid in mixing. This curable epoxy resin composition is then cured by heating to a temperature of at least 100° C., preferably at least 125° C. While in principle there is no upper temperature limit for curing, preferred curing temperatures will not exceed about 250° C.

In accordance with this invention, it has been found that it is possible to combine specific epoxy resins, metal carboxylate salts, and cure modifiers in specified amounts to obtain outstanding performance. Thus, combinations of from about 1 to about 100 phr of cure modifiers selected from the group amide-alcohols, phenols, imides, alcohols (mono and difunctional; benzylic, primary, and secondary), amides, and sulfonamides, together with from about 0.1 to about 50 phr metal carboxylate salts selected from Group IA and Ca metal salts and being derived from carboxylic acids contain-

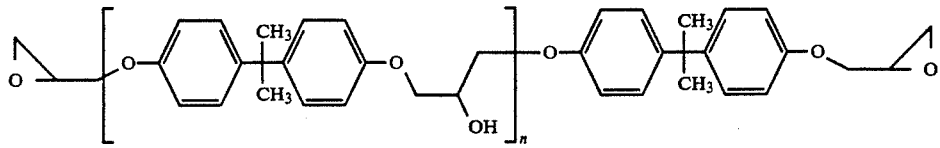

ing 1 carboxyl group, have been found to provide particularly attractive curing of glycidyl type epoxy resins.

More preferred, combinations of from about 1 to about 50 phr of cure modifiers selected from the group amide-alcohols derived from ethanolamines and mono and difunctional carboxylic acids, bisphenol A, bisphenol S, tetrabromobisphenol A, novolac and resole resins, phenoxy resins, phthalimide, tetrahydrophthalimide, oxydiphthalimide, and hexaflouroisopropylidenediphthalimide, together with from about 1 to about 10 phr metal carboxylate salts selected from sodium benzoate, sodium acetate, and calcium benzoate, have been found to provide particularly attractive curing of glycidyl type epoxy resins selected from bisphenol A based epoxy resins, brominated epoxy resins, epoxy novolacs, and multifunctional epoxy resins such as triglycidyl p-aminophenol and tetraglycidyl methylenedianiline.

Even more preferred, combinations of from about 1 to about 20 phr of cure modifiers comprising amide-alcohols derived from ethanolamines selected from ethanolamine, diethanolamine, and 2-amino-2-methylpropanol, and carboxylic acids selected from benzoic acid, phthalic acid, isophthalic acid, terephthalic acid, and adipic acid, together with from about 2 to about 8 phr metal carboxylate salts selected from sodium benzoate, sodium acetate, and calcium benzoate have been found to provide exceptionally attractive curing of glycidyl type epoxy resins selected from bisphenol A based epoxy resins and brominated epoxy resins.

In accordance with this invention, it has also been found that it is possible to combine specific epoxy resins with specific metal carboxylate salts, in the absence of added cure modifiers, to obtain attractive performance. Thus, metal carboxylate salts selected from Group IA metal salts and being derived from carboxylic acids containing 1 carboxyl group, have been found to provide particularly attractive curing of relatively polar epoxy resins such as triglycidyl p-aminophenol and flexibilized bisphenol A epoxy resin. Further, more readily solubilized metal carboxylate salts, such as lithium benzoate, potassium benzoate, sodium oleate, sodium 4-hydroxybutyrate, sodium p-chlorobenzoate, and sodium salicylate, have been found to provide particularly attractive curing of polyepoxides in the absence of added cure modifiers.

For a fuller understanding of the nature and advantages of this invention, reference may be made to the following examples. These examples are given merely to illustrate the invention and are not to be construed in a limiting sense. All quantities, proportions and percentages are by weight and all references to temperature are degrees C. The abbreviation phr in the examples indicates parts per hundred parts of epoxy resin. Cure modifiers and metal carboxylates which were solid at room temperature were generally ground to a particle size of about 40 microns or less, unless otherwise indicated.

In the following examples, the various properties were measured as described below. Glass transition temperature ($T_g$) was determined by DMA (dynamic mechanical analysis) and defined as the peak of the loss modulus curve. Lap shear strength (LSS) was determined by Al/Al tensile lap shear tests in accordance with ASTM D1002-72. Further, all of the compositions in the examples were cured at about 180° C. for about 30 minutes prior to evaluation for $T_g$ and LSS, unless otherwise indicated. The observations "charred" or "brittle" indicate that the sample was unsuitable for $T_g$ evaluation by DMA. Cabosil TS 720, a fumed silica thixotrope, was included to allow evaluation of these compositions for adhesive strength.

EXAMPLE I

A bisphenol A-diglycidyl ether based epoxy resin composition containing 3 phr Cabosil TS 720 and 6 phr sodium benzoate was analyzed by DSC for cure rate at various temperatures. Likewise, a formulated composition as above, to which 15 phr N,N'-diethanol isophthalamide (H-Iso) was added as a cure modifier, was also analyzed by DSC for cure rate at various temperatures. Time to reach peak cure exotherm, as well as time to reach >95% of the total cure exotherm, was determined. The results thereof are summarized in Table 1.

TABLE 1

| | Effect of Cure Modifier on Cure Rate | |
|---|---|---|
| Curing System | Time to Peak Exotherm at 180° C. Cure Temperature | Minimum Temperature for 30 min Cure |
| Sodium Benzoate alone | 40 min | ca. 190–200° C. |
| Sodium Benzoate with H-Iso | 3 min | ca. 140–150° C. |

This data shows the substantially enhanced reactivity obtained with the metal carboxylate curing catalysts of this invention, through the use of cure modifiers such as H-Iso. The long cure times and high temperatures generally associated with anionic curing initiators have been overcome.

EXAMPLE II

To a bisphenol A-diglycidyl ether based epoxy resin composition containing 3 phr Cabosil TS 720 was added the various curing systems at the levels indicated. The pot-life of these compositions at 80° C. were then evaluated by Brookfield viscometry, with the time to double in viscosity reported. After curing under the conditions indicated, the compositions were also evaluated for $T_g$ and LSS. The results thereof are summarized in Table 2.

TABLE 2

| | Comparison to Commercial Latent Epoxy Curing Systems | | | | |
|---|---|---|---|---|---|
| | | Cure Schedule | | | |
| | 80° C. | 180° C. for 30 min | | 140° C. for 30 min | |
| Curing System | Pot-Life | $T_g$ | LSS | $T_g$ | LSS |
| 15 phr H-Iso 6 phr Sodium Benzoate | >5 days | 157° C. | 21 N/mm$^2$ | 149° C. | 22 N/mm$^2$ |
| 6 phr DICY 2 phr Quat | 12 hrs | 148° C. | 26 N/mm$^2$ | 117° C. | 4 N/mm$^2$ |
| 6 phr DICY 2 phr PDMU | 4 hrs | charred | 26 N/mm$^2$ | 159° C. | 22 N/mm$^2$ |
| 5 phr BCl$_3$/ | 12 hrs | 133° C. | 13 N/mm$^2$ | — | — |

TABLE 2-continued

Comparison to Commercial Latent Epoxy Curing Systems

| Curing System | 80° C. Pot-Life | 180° C. for 30 min | | 140° C. for 30 min | |
|---|---|---|---|---|---|
| | | $T_g$ | LSS | $T_g$ | LSS |
| Amine | | | | | | where
H-Iso is N,N'-diethanolisophthalamide
DICY is dicyandiamide
Quat is dimethyldistearylammonium chloride
PDMU is phenyldimethylurea
BCl$_3$/Amine is DY 9577 (Ciba-Geigy)

This data shows the superior combination of latency at elevated temperature plus facile curing at low temperature obtainable with the metal carboxylate curing systems of this invention, as compared to commercial latent epoxy curing systems. The development of attractive final cured properties under relatively mild curing conditions is also shown.

EXAMPLE III

To a bisphenol A-diglycidyl ether based epoxy resin composition containing 3 phr Cabosil TS 720 was added 6 phr of various metal carboxylates. After curing, the compositions were then evaluated for $T_g$ and LSS. Likewise formulated compositions to which 15 phr N,N'-diethanol isophthalamide (H-Iso) was added as a cure modifier were also evaluated for $T_g$ and LSS. The results thereof are summarized in Table 3.

TABLE 3

| Metal Variation In Metal Carboxylate | Metal Carboxylate Evaluation | | | |
|---|---|---|---|---|
| | without H-Iso | | with H-Iso | |
| | $T_g$ | LSS | $T_g$ | LSS |
| Lithium Benzoate | 82/138° C. | 6 N/mm$^2$ | 152° C. | 20 N/mm$^2$ |
| Sodium Benzoate | incomplete cure | | 160° C. | 20 N/mm$^2$ |
| Potassium Benzoate | 140/158° C. | 13 N/mm$^2$ | 146° C. | 19 N/mm$^2$ |
| Calcium Benzoate | incomplete cure | | 115° C. | 22 N/mm$^2$ |
| Calcium Ricinoleate | incomplete cure | | 97° C. | 20 N/mm$^2$ |
| Ferric Octoate | | | incomplete cure | |
| Zinc Stearate | incomplete cure | | brittle | 4 N/mm$^2$ |
| Aluminum Benzoate | incomplete cure | | incomplete cure | |
| Stannous Octoate | incomplete cure | | brittle | 2 N/mm$^2$ |

This data shows that superior cure is obtained with the lithium, sodium, potassium, and calcium carboxylates compared to the transition metal salts, and that enhanced performance is obtained by the addition of the cure modifier, H-Iso.

EXAMPLE IV

To a bisphenol A-diglycidyl ether based epoxy resin composition containing 3 phr Cabosil TS 720 was added 6 phr of sodium carboxylates derived from various carboxylic acids. After curing, the compositions were then evaluated for $T_g$ and LSS. Likewise formulated compositions to which 15 phr N,N'-diethanol isophthalamide (H-Iso) was added as a cure modifier were also evaluated for $T_g$ and LSS. The results thereof are summarized in Table 4.

TABLE 4

| Carboxylate Variation In Metal Carboxylate | Metal Carboxylate Evaluation | | | |
|---|---|---|---|---|
| | without H-Iso | | with H-Iso | |
| | $T_g$ | LSS | $T_g$ | LSS |
| Sodium Oleate | 94° C. | 8 N/mm$^2$ | 144° C. | 21 N/mm$^2$ |
| Sodium 4-Hydroxy-Butyrate | brittle | 11 N/mm$^2$ | 151° C. | 21 N/mm$^2$ |
| Sodium Formate | incomplete cure | | 142° C. | 21 N/mm$^2$ |
| Sodium Acetate | incomplete cure | | 157° C. | 17 N/mm$^2$ |
| Sodium Trichloro-Acetate | | | incomplete cure | |
| Sodium Citrate | | | incomplete cure | |
| Sodium d-Gluconate | | | incomplete cure | |
| Sodium Succinate | | | incomplete cure | |
| Sodium m-Nitrobenzoate | brittle | 7 N/mm$^2$ | 144° C. | 23 N/mm$^2$ |
| Sodium p-Chlorobenzoate | 100° C. | 13 N/mm$^2$ | 147° C. | 23 N/mm$^2$ |
| Sodium p-Hydroxybenzoate | incomplete cure | | 157° C. | 22 N/mm$^2$ |
| Sodium o-Hydroxybenzoate | 115° C. | 14 N/mm$^2$ | 146° C. | 19 N/mm$^2$ |
| Sodium p-Methoxybenzoate | incomplete cure | | 151° C. | 22 N/mm$^2$ |

This data shows the utility of a broad range of metal carboxylates, containing organic groups ranging from small to large, and also containing electron withdrawing or donating groups. Although sodium trichloroacetate is soluble in the epoxy resin formulation with H-iso at the cure temperature, excessive electron withdrawal from the carboxylate group renders it ineffective as a curing agent. Carboxylate salts with a high density of highly polar functional groups are not soluble in this matrix, and thus do not constitute a curing composition. The cure modifier H-Iso is shown to enhance product performance.

EXAMPLE V

To a bisphenol A-diglycidyl ether based epoxy resin composition containing 3 phr Cabosil TS 720 and 15 phr N,N'-diethanol isophthalamide (H-Iso) as a cure modifier was added 6 phr of polyfunctional sodium carboxylates. After curing, the compositions were then evaluated for $T_g$ and LSS. The results thereof are summarized in Table 5.

TABLE 5

Polyfunctional Metal Carboxylate Evaluation

| POLYFUNCTIONAL METAL CARBOXYLATES | with H-Iso $T_g$ | LSS |
|---|---|---|
| Disodium Isophthalate | incomplete cure | |
| Disodium t-Butylisophthalate | 155° C. | 20 N/mm² |
| Disodium Succinate | incomplete cure | |
| Trisodium Citrate | incomplete cure | |
| Poly(Sodium Acrylate) M.W. 5100 | incomplete cure | |

This data shows that a difunctional alkali metal carboxylate may be used providing it incorporates sufficient solubilizing groups.

EXAMPLE VI

To a bisphenol A-diglycidyl ether based epoxy resin composition containing 3 phr Cabosil TS 720 and 6 phr sodium benzoate was added 15 phr of various alcohols as cure modifiers. In the case of phenoxy resin as a cure modifier, this material was introduced as a tetrahydrofuran solution, and the solvent was removed under vacuum before curing. After curing, the compositions were evaluated for $T_g$ and LSS. The results thereof are summarized in Table 6.

TABLE 6

Cure Modifier Evaluation

| ALCOHOLS | $T_g$ | LSS |
|---|---|---|
| Benzyl Alcohol | 119° C. | 17 N/mm² |
| 1-Decanol | 126° C. | 4 N/mm² |
| 2-Decanol | brittle | 7 N/mm² |
| 3,7-Dimethyl-3-Octanol | incomplete cure | |
| 1,4-Benzenedimethanol | 137° C. | 20 N/mm² |
| 1,6-Hexanediol | 101° C. | 16 N/mm² |
| 2,2-Dimethyl-1,3-Propanediol | 129° C. | 17 N/mm² |
| 2,5-Hexanediol | 110° C. | 17 N/mm² |
| 1,4-Cyclohexanediol | 128° C. | 16 N/mm² |
| 2,5-Dimethyl-2,5-Hexanediol | incomplete cure | |
| Glycerol | incomplete cure | |
| 2-Ethyl-2-(Hydroxymethyl)-1,3-Propanediol | incomplete cure | |
| Di-Pentaerythritol | incomplete cure | |
| Inositol | incomplete cure | |
| Sorbitol | incomplete cure | |
| Poly(vinylalcohol) | 102° C. | 10 N/mm² |
| Phenoxy resin | 149° C. | 12 N/mm² |

This data demonstrates the broad utility of compounds containing benzylic, primary, or secondary alcohols as cure modifiers. Alcohols, such as glycerol, which have a very high density of polar functionality will not function as cure modifiers if they do not adequately dissolve in the epoxy resin.

EXAMPLE VII

To a bisphenol A-diglycidyl ether based epoxy resin composition containing 3 phr Cabosil TS 720 and 6 phr sodium benzoate was added 15 phr of various amides as cure modifiers. After curing, the compositions were evaluated for $T_g$ and LSS. The results thereof are summarized in Table 7.

TABLE 7

Cure Modifier Evaluation

| | $T_g$ | LSS |
|---|---|---|
| AMIDES | | |
| Benzamide | 128° C. | 21 N/mm² |
| N-Butylbenzamide | 123° C. | 15 N/mm² |
| N-Methyl-N-Butyl Benzamide | 114° C. | 15 N/mm² |
| SULFONAMIDES | | |
| Benzensulfonamide | 164° C. | 18 N/mm² |
| p-Toluenesulfonamide | 157° C | 17 N/mm² |
| AMIDE-AlCOHOLS | | |
| N-Ethanolbenzamide | 116° C. | 21 N/mm² |
| H-Iso | 156° C. | 20 N/mm² |
| H-Tere | 155° C. | 19 N/mm² |
| Gem-Iso | 134° C. | 17 N/mm² |
| Adip | 119° C. | 19 N/mm² | where H-Iso is N,N'-diethanolisophthalamide, H-Tere is N,N'-diethanol-terephthalamide, Gem-Iso is N,N'-bis-(1,1-dimethyl-2-hydroxyethyl)-isophthalamide, and Adip is N,N,N',N'-tetraethanoladipamide.

This data shows that amides of carboxylic or sulfonic acids function as cure modifiers, and that amides bearing alcohol functionality are particularly effective cure modifiers.

EXAMPLE VIII

To a bisphenol A-diglycidyl ether based epoxy resin composition containing 3 phr Cabosil TS 720 and 6 phr sodium benzoate was added 15 phr of various quaternary ammonium and phosphonium compounds as cure modifiers. After curing, the compositions were evaluated for $T_g$ and LSS. The results thereof are summarized in Table 8.

TABLE 8

Cure Modifier Evaluation

| ONIUM COMPOUNDS | $T_g$ | LSS |
|---|---|---|
| Choline Chloride | 104° C. | 11 N/mm² |
| Dimethyldistearylammonium chloride | 71° C. | 9 N/mm² |
| Tetrabutylphosphonium bromide | 97° C. | 8 N/mm² |

This data shows the utility of compounds containing quaternary ammonium or phosphonium halide functionality as cure modifiers.

EXAMPLE IX

To a bisphenol A-diglycidyl ether based epoxy resin composition containing 3 phr Cabosil TS 720 and 6 phr sodium benzoate was added 15 phr of various imides as cure modifiers. After curing, the compositions were evaluated for $T_g$ and LSS. The results thereof are summarized in Table 9.

TABLE 9

Cure Modifier Evauation

| IMIDES | $T_g$ | LSS |
|---|---|---|
| Succinimide | 152° C. | 14 N/mm² |
| Phthalimide | 140° C. | 23 N/mm² |
| Tetrahydrophthalimide | 147° C. | 21 N/mm² |
| Oxy-Diphthalimide | 190° C. | 18 N/mm² |
| Hexafluoroisopropylidene-Diphthalimide | 205° C. | 17 N/mm² |

This data shows the utility of imides as cure modifiers, as well as the exceptionally high $T_g$'s obtainable with formulations containing such compounds.

EXAMPLE X

To a bisphenol A-diglycidyl ether based epoxy resin composition containing 3 phr Cabosil TS 720 and 6 phr sodium benzoate was added 15 phr of various ethers as cure modifiers. After curing, the compositions were evaluated for $T_g$ and LSS. The results thereof are summarized in Table 10.

TABLE 10

| Cure Modifier Evaluation | | |
|---|---|---|
| ETHERS | $T_g$ | LSS |
| 18-Crown-6 | 140° C. | 10 Nmm$^2$ |
| Dibenzo 18-Crown-6 | 145° C. | 12 Nmm$^2$ |
| Tetraethylene Glycol Dimethyl Ether | brittle | 11 N/mm$^2$ |
| Poly(ethylene Glycol) | 108° C. | 21 N/mm$^2$ |

This data shows the general utility of compounds containing ether functionality as cure modifiers.

EXAMPLE XI

To a bisphenol A-diglycidyl ether based epoxy resin composition containing 3 phr Cabosil TS 720 and 6 phr sodium benzoate was added 15 phr (unless otherwise indicated) of various esters as cure modifiers. After curing, the compositions were evaluated for $T_g$ and LSS. The results thereof are summarized in Table 11.

TABLE 11

| Cure Modifier Evaluation | | |
|---|---|---|
| ESTERS/LACTONES | $T_g$ | LSS |
| Dimethyl Phthalate | incomplete cure | |
| Benzyl Benzoate | incomplete cure | |
| γ-Butyrolactone | 132° C. | 15 N/mm$^2$ |
| ε-Caprolactone | charred | 14 N/mm$^2$ |
| Cyanate Esters | | |
| Bisphenol A Dicyanate ester (50 phr) | 159° C. | 16 N/mm$^2$ |

This data shows the utility of compounds containing cyanate ester or lactone functionality as cure modifiers.

EXAMPLE XII

To a bisphenol A-diglycidyl ether based epoxy resin composition containing 3 phr Cabosil TS 720 and 6 phr sodium benzoate was added 15 phr of various phenols as cure modifiers. After curing, the compositions were evaluated for $T_g$ and LSS. The results thereof are summarized in Table 12.

TABLE 12

| Cure Modifier Evaluation | | |
|---|---|---|
| PHENOLS | $T_g$ | LSS |
| 4-t-Butylphenol | 147° C. | 17 N/mm$^2$ |
| 4-Nitrophenol | 125° C. | 22 N/mm$^2$ |
| Bisphenol A | 171° C. | 20 N/mm$^2$ |
| Bisphenol S | 198° C. | 17 N/mm$^2$ |
| Catechol | 147° C. | 22 N/mm$^2$ |
| Anthrarufin | 150° C. | 13 N/mm$^2$ |

This data demonstrates the general utility of compounds containing phenolic functionality as cure modifiers, as well as the exceptionally high $T_g$'s obtainable.

EXAMPLE XIII

To a bisphenol A-diglycidyl ether based epoxy resin composition containing 3 phr Cabosil TS 720 and 6 phr sodium benzoate was added 15 phr of various sulfones or sulfoxides as cure modifiers. After curing, the compositions were evaluated for $T_g$ and LSS. The results thereof are summarized in Table 13.

TABLE 13

| Cure Modifier Evaluation | | |
|---|---|---|
| SULFONES/SULFOXIDES | $T_g$ | LSS |
| Dimethyl Sulfone | 137° C. | 12 N/mm$^2$ |
| Tetramethylene Sulfone | 126° C. | 15 N/mm$^2$ |
| Bis(phenylsulfonyl)methane | brittle | 2 N/mm$^2$ |
| Dimethylsulfoxide | charred | 14 N/mm$^2$ |

This data demonstrates the utility of compounds containing sulfone or sulfoxide functionality as cure modifiers.

EXAMPLE XIV

To a bisphenol A-diglycidyl ether based epoxy resin composition containing 3 phr Cabosil TS 720 and 6 phr sodium benzoate was added 15 phr of oximes as cure modifiers. After curing, the compositions were evaluated for $T_g$ and LSS. The results thereof are summarized in Table 14.

TABLE 14

| Cure Modifier Evaluation | | |
|---|---|---|
| OXIMES | $T_g$ | LSS |
| 5-Dodecylsalicylaldoxime | 157° C. | 18 N/mm$^2$ |
| 5-Nonyl-2-hydroxyacetophenoxime | brittle | 18 N/mm$^2$ |

This data shows the utility of compounds containing oxime functionality as cure modifiers.

EXAMPLE XV

To a bisphenol A-diglycidyl ether based epoxy resin composition containing 3 phr Cabosil TS 720 and 6 phr sodium benzoate was added 15 phr of various compounds as cure modifiers. After curing, the compositions were evaluated for $T_g$ and LSS. The results thereof are summarized in Table 15.

TABLE 15

| Cure Modifier Evaluation | | |
|---|---|---|
| | $T_g$ | LSS |
| Diphenylmethane | incomplete cure | |
| 1,2,3,4,-Tetrahydronaphthalene | incomplete cure | |
| 1-Chloronaphthalene | incomplete cure | |
| Acetophenone | incomplete cure | |

This data shows the ineffectiveness as cure modifiers of selected compounds having relatively low solvating ability.

EXAMPLE XVI

To a variety of epoxy resin blends containing 3 phr Cabosil TS 720 was added 6 phr sodium benzoate. After curing, the compositions were evaluated for $T_g$ and LSS. Similarly, formulated compositions to which 15 phr N,N'-diethanolisophthalamide (H-Iso) was added as cure modifier were also evaluated for $T_g$ and LSS. The results thereof are summarized in Table 16.

TABLE 16

| Epoxy Resin Evaluation | | | | |
|---|---|---|---|---|
| | Without H-Iso | | with H-Iso | |
| Epoxy Resin Blends | Tg | LSS | Tg | LSS |
| Bisphenol A-diglycidyl ether (1) | | | 156° C. | 20 N/mm$^2$ |
| 75% (1) + 25% DEN 438$^{(2)}$ | brittle | 4 N/mm$^2$ | 162° C. | 15 N/mm$^2$ |
| 50% (1) + 50% DEN 438$^{(2)}$ | | | 173° C. | 16 N/mm$^2$ |
| 75% (1) + | 168° C. | 11 N/mm$^2$ | 166° C. | 18 N/mm$^2$ |

TABLE 16-continued

| | Epoxy Resin Evaluation | | | |
|---|---|---|---|---|
| | Without H-Iso | | with H-Iso | |
| Epoxy Resin Blends | Tg | LSS | Tg | LSS |
| 25% MY0510[3] 50% (1) + 50% MY0510[3] | | | Charred | 18 N/mm² |
| 75% (1) + 25% MY721[4] | incomplete cure | | 163° C. | 18 N/mm² |
| 50% (1) + 50% MY721[4] | | | Charred | 19 N/mm² |
| 75% (1) + 25% XB4122[5] | 127° C. | 10 N/mm² | 123° C. | 15 N/mm² |
| 50% (1) + 50% XB4122[5] | | | 84° C. | 20 N/mm² |
| 25% (1) + 75% XB4122[5] | | | 80° C. | 23 N/mm² |
| 100% XB4122[5] | | | incomplete cure | |
| 95% (1) + 5% Actipol E6[6] | incomplete cure | | 135° C. | 15 N/mm² |
| 90% (1) + 10% Actipol E6[6] | | | 145° C. | 18 N/mm² |
| 85% (1) + 15% Actipol E6[6] | | | 138° C. | 17 N/mm² |
| 100% CY179[7] | | | incomplete cure | |

[2] DEN 438 is a glycidyl novolac epoxy (Dow).
[3] MY 0510 is triglycidyl-p-aminophenol (Ciba-Geigy).
[4] MY 721 is tetraglycidyl-methylenedianiline (Ciba-Geigy).
[5] XB 4122 is a flexibilized bisphenol A type epoxy (Ciba-Geigy).
[6] Actipol E6 is an epoxy polybutene (Amoco).
[7] CY179 is a di-cyclohexeneoxide cycloaliphatic epoxy (Ciba-Geigy).

This data demonstrates the ability to modify performance characteristics by varying the epoxy resin portion of a formulation. It is even possible to enhance the solubility of the metal carboxylate to the point that a cure modifier is not required for acceptable curing to take place. It also demonstrates that, even in these cases, improved properties of the cured polymer may be obtained when a cure modifier such as H-Iso is also used.

EXAMPLE XVII

To a bisphenol A-diglycidyl ether based epoxy resin composition containing 3 phr Cabosil TS 720 was added various examples of the metal carboxylate curing systems of this invention, at the levels indicated. These compositions were then evaluated for reactivity versus temperature by DSC, scanning from room temperature to 300° C. at 5° C./min ramp rate. The temperatures corresponding to exotherm onset and exotherm peak were determined. Comparison of the exotherm onset temperatures of the various curing systems provides an indication of the relative latencies of these compositions (higher exotherm onset temperature corresponds to latency at higher temperatures). Comparison of the exotherm peak temperatures of the various curing systems provides an indication of the relative reactivities of these compositions (lower exotherm peak temperature corresponds to the ability to cure at lower temperatures). The results thereof are summarized in Table 17.

TABLE 17

| | Relative Latency and Reactivity Assessments | |
|---|---|---|
| Curing System | Cure Exotherm Onset | Cure Exotherm Peak |
| 6 phr Na Benzoate | 220° C. | 235° C. |
| 15 phr H-Iso | 140° C. | 165° C. |
| 6 phr Na Benzoate | | |
| 15 phr N-Ethylformamide | 125° C. | 185° C. |
| 6 phr Na Benzoate | | |
| 15 phr N-Ethylformamide | 80° C. | 160° C. |
| 6 phr K Benzoate | | |
| 15 phr N-Ethylformamide | 95° C. | 160° C. |
| 6 phr Li Benzoate | | |
| 15 phr Dimethyldistearyl-ammonium Chloride | 75° C. | 115° C. |
| 6 phr Na Benzoate | | |
| 15 phr N-(2-methoxyethyl)-Benzamide | 200° C. | 220° C. |
| 6 phr Na Benzoate | | |
| 15 phr H-Phth | 115° C. | 120° C. and 160° C. |
| 6 phr Na Benzoate | | | where H-Iso is N,N'-diethanolisophthalamide and H-Phth is N,N'-diethanolphthalamide.

This data shows the ability to modify the latency and reactivity of the metal carboxylate curing systems described herein, by varying the cure modifier and/or metal carboxylate. Thus, the temperature at which facile curing occurs can be varied over a wide range to match requirements for specific applications. It is also shown that, through careful choice of both the cure modifier and metal carboxylate, superior latency can be obtained without sacrificing reactivity at a desired cure temperature.

COMPARATIVE EXAMPLE 1

This experiment is based on the formulation in Example 1 of Japan patent 64-4,568. A bisphenol A-diglycidyl ether based epoxy resin composition containing 20 phr ethylene glycol, 3 phr magnesium sulfate, and 3 phr Cabosil TS 720 was heated for 4 hours at 120° C. and examined. The composition was unchanged in appearance, i.e. curing or hardening had not occurred. The same results were obtained after heating for 30 minutes at 180° C.

What is claimed is:

1. A heat-curable epoxy resin composition free of cure-effective amounts of an amine, carboxylic anhydride, or carboxylic acid in the acid form, comprising:
   (a) at least one polyepoxide;
   (b) from about 0.1 to about 50 parts of a metal carboxylate salt curing agent per hundred parts by weight of total epoxy resin, said metal carboxylate salt being selected from a Group IA or Group IIA metal and being derived from a carboxylic acid containing from 1 to 4 carboxyl groups, wherein said metal carboxylate salt is substantially soluble in said epoxy resin composition at a cure temperature of above about 100° C.; and
   (c) from about 1 to about 100 parts of a cure modifier per hundred parts by weight of total epoxy resin, said cure modifier containing polar functionality, being soluble in said epoxy resin composition at said cure temperature and having sufficient solvating strength as to increase the solubility of said metal carboxylate salt in said epoxy resin to curing effective levels at said cure temperature.

2. A composition as in claim 1 wherein the corresponding carboxylic acid of said metal carboxylate salt has a pKa value of above about 3.

3. A composition as in claim 1 wherein said polyepoxide is a polyglycidyl compound.

4. A composition as in claim 3 wherein said polyepoxide is selected from a polyglycidyl derivative of a polyhydric phenol, polyhydric alcohol, polyhydric aromatic amine, polyhydric aminophenol, or polyhydric carboxylic acid.

5. A composition as in claim 4 wherein said polyepoxide comprises a glycidyl ether of a brominated polyhydric phenol.

6. A composition as in claim 1 wherein said polyepoxide is selected from liquid or solid bisphenol A based epoxy resins, epoxy phenol novolac or epoxy cresol novolac resins, triglycidyl-p-aminophenol, triglycidylisocyanurate, tetraglycidyl-methylenedianiline, tetraglycidyl-tetrakis-(4-hydroxyphenyl)ethane, or diglycidyl-hexahydrophthalic acid.

7. A composition as in claim 1 wherein said metal carboxylate salt is a carboxylate salt of a metal selected from lithium, sodium, or potassium.

8. A composition as in claim 1 wherein said metal carboxylate salt is a carboxylate salt of calcium.

9. A composition as in claim 1 wherein said metal carboxylate salt is derived from a carboxylic acid containing 1 carboxyl group.

10. A composition as in claim 1 wherein said metal carboxylate salt is present in an amount of from about to about 10 parts per hundred parts by weight of total epoxy resin.

11. A composition as in claim 1 wherein said metal carboxylate salt is selected from lithium benzoate, sodium benzoate, potassium benzoate, calcium benzoate, sodium oleate, sodium 4-hydroxybutyrate, sodium formate, sodium acetate, sodium m-nitrobenzoate, sodium p-chlorobenzoate, sodium p-hydroxybenzoate, sodium salicylate, sodium p-methoxybenzoate or disodium t-butylisophthalate.

12. A composition as in claim 1 wherein said cure modifier is sufficiently polar as to increase the polarity of said epoxy resin composition at said cure temperature.

13. A composition as in claim 1 wherein said metal carboxylate salt is substantially insoluble in said epoxy resin composition at room temperature, and is substantially soluble therein at a curing temperature of from about 100° C. to about 250° C.

14. A composition as in claim 1 wherein said cure modifier is present in an amount of from about 1 to about 50 parts per hundred parts by weight of total epoxy resin.

15. A composition as in claim said cure modifier is present in an amount of from about 1 to about 20 parts per hundred parts by weight of total epoxy resin.

16. A composition as in claim 1 wherein said cure modifier contains functionality selected from a lactone, ether, sulfone, sulfoxide, cyanate ester, quaternary ammonium or phosphonium compound.

17. A composition as in claim 1 wherein said cure modifier contains functionality selected from an alcohol, amide, imide, oxime, phenol, or sulfonamide.

18. A composition as in claim 16, wherein said lactone is selected from γ-butyrolactone or ε-caprolactone.

19. A composition as in claim 16, wherein said ether is selected from 18-crown-6 ether, dibenzo-18-crown-6 ether, tetraethylene glycol dimethyl ether, and polyethylene glycol ether.

20. A composition as in claim 16 wherein said sulfone is selected from dimethyl sulfone, tetramethylene sulfone, and bis-(phenylsulfonyl) methane.

21. A composition as in claim 16 wherein said sulfoxide comprises dimethyl sulfoxide.

22. A composition as in claim 16 wherein said quaternary compound is selected from (2-hydroxyethyl) trimethylammonium chloride, dimethyldistearylammonium chloride, and tetrabutylphosphonium bromide.

23. A composition as in claim 17 wherein said alcohol is selected from a benzyl, pr and secondary alcohol.

24. A composition as in claim 23 wherein said alcohol contains from 1 to 2 alcohol groups.

25. A composition as in claim 23 wherein said alcohol is selected from benzyl alcohol, 1-decanol, 2-decanol, ethylene glycol, propylene glycol, 1,4-benzenedimethanol, 1,6-hexanediol, 2,2-dimethyl-1, 3-propanediol, 2,5-hexanediol, 1,4-cyclohexanediol, polyvinyl alcohol, and phenoxy resins.

26. A composition as in claim 17 wherein said amide is selected from benzamide, N-butylbenzamide, or N-methyl-N-butylbenzamide.

27. A composition as in claim 17 wherein said imide is selected from succinimide, phthalimide, tetrahydrophthalimide, oxy-diphthalimide, or hexafluoroisopropylidene-diphthalimide.

28. A composition as in claim 17 wherein said oxime is selected from 5-dodecylsalicylaldoxime or 5-nonyl-2-hydroxyacetophenoxime.

29. A composition as in claim 17 wherein said phenol is selected from catechol, 4-t-butylphenol, 4-nitrophenol, bisphenol A, bisphenol S, 1,5-dihydroxyanthraquinone, resole resins, or novolac resins.

30. A composition as in claim 17 wherein said sulfonamide is selected from benzenesulfonamide or p-toluenesulfonamide.

31. A composition as in claim 17 wherein said cure modifier is an amide-alcohol containing amide and alcohol functionality.

32. A composition as in claim 31 wherein said amide-alcohol has the structural formula $$R_1-[-C(O)-NH_m-(R_2-OH)_{2-m}]_n$$

wherein
$R_1$ represents (a) an aliphatic, cycloaliphatic, aromatic, or araliphatic group, which may be substituted or unsubstituted, and which may or may not contain heteroatoms, or (b) a single bond; $R_2$ represents a divalent aliphatic group, which may be substituted or unsubstituted, and which may or may not contain heteroatoms; m is 0 or 1; and n is 1 or 2.

33. A composition as in claim 32 wherein said amide-alcohol is selected from one wherein in said structural formula $R_2$ is the group $-CR_3R_4-CR_5R_6-$, and $R_3$, $R_4$, $R_5$ and $R_6$ may be the same or different, and may represent hydrogen, alkyl, or hydroxyalkyl groups.

34. A composition as in claim 32 wherein said amide-alcohol is selected from one wherein in said structural formula $R_2$ is selected from $-CH_2CH_2-$, $-C(CH_3)_2CH_2-$, $-C(CH_2CH_3)(CH_2OH)CH_2-$, $-C(CH_2OH)_2CH_2-$, $-CH(CH_2CH_3)CH_2-$, $-CH_2CH(CH_3)-$, $-CH_2CH(CH_2CH_3)-$, $-CH_2CH_2CH_2-$, $-CH_2CH_2CH_2CH_2-$.

35. A composition as in claim 32 wherein said amide-alcohol is selected from one wherein in said structural formula
$R_1=$1,2-substituted-benzene, $R_2=-CH_2CH_2-$, m=1, and n=2;
$R_1=$1,2-substituted-benzene, $R_2=-C(CH_3)_2CH_2-$, m=1, and n=2;
$R_1=$1,3-Substituted-benzene, $R_2=-CH_2CH_2-$, m=1, and n=2;
$R_1=$1,3-substituted-benzene, $R_2=-C(CH_3)_2CH_2-$, m=1, and n=2;

$R_1$=1,4-substituted-benzene, $R_2$=—CH$_2$CH$_2$—, m=1, and n=2;

$R_1$=1,4-substituted-benzene, $R_2$=—C(CH$_3$)$_2$CH$_2$—, m=1, and n=2;

$R_1$=phenyl, $R_2$=—CH$_2$CH$_2$—, m=1, and n=1;

$R_1$=phenyl, $R_2$=—C(CH$_3$)$_2$CH$_2$—, m=1, and n=1;

$R_1$=—CH$_2$CH$_2$CH$_2$CH$_2$—, $R_2$=—CH$_2$CH$_2$—, m=0, and n=2;

$R_1$=1,3-substituted-benzene, $R_2$=—CH$_2$CH$_2$—, m=0, and n=1; or $R_1$=phenyl, $R_2$=—CH$_2$CH$_2$—, m=0, and n=1.

36. A composition as in claim 53 wherein said cyanate ester is selected from the poly-cyanate esters of bisphenol A, tetramethylbisphenol F, thiodiphenol, hexafluorobisphenol A, bisphenol E, dicyclopentadienephenol condensates or their partially trimerized blends.

37. A composition as in claim 31 wherein said metal carboxylate salt is selected from a Group IA alkali metal salt or calcium salt and is derived from a carboxylic acid containing 1 carboxyl group, and said epoxy resin comprises a glycidyl resin.

38. A composition as in claim 33 wherein said amide-alcohol is present in an amount of from about 1 to about 50 parts per hundred parts by weight of total epoxy resin, said metal carboxylate salt is selected from sodium benzoate, sodium acetate or calcium benzoate present in an amount of from about 1 to about 10 parts per hundred parts by weight of total epoxy resin, and said epoxy resin is selected from bisphenol A based epoxy resins or their brominated derivatives, epoxy novolacs, triglycidyl p-aminophenol, or tetraglycidyl methylenedianiline.

39. A composition as in claim 35 wherein said amide-alcohol is present in an amount of from about 1 to about 20 parts per hundred parts by weight of total epoxy resin, said metal carboxylate salt is selected from sodium benzoate, sodium acetate or calcium benzoate present in an amount of from about 2 to about 8 parts per hundred parts by weight of total epoxy resin, and said epoxy resin is selected from bisphenol A based epoxy resins or their brominated derivatives.

40. A composition as in claim 17 wherein said cure modifier contains phenolic functionality, said metal carboxylate salt is selected from a Group IA alkali metal salt or calcium salt and is derived from a carboxylic acid containing 1 carboxyl group, and said epoxy resin comprises a glycidyl resin.

41. A composition as in claim 29 wherein said cure modifier is present in an amount of from about 1 to about 50 parts per hundred parts by weight of total epoxy resin, said metal carboxylate salt is selected from sodium benzoate, sodium acetate, or calcium benzoate and is present in an amount of from about 1 to about 10 parts per hundred parts by weight of total epoxy resin, and said epoxy resin is selected from bisphenol A based epoxy resins or their brominated derivatives, epoxy novolacs, triglycidyl p-aminophenol, or tetraglycidyl methylenedianiline.

42. A composition as in claim 17 wherein said cure modifier contains imide functionality, said metal carboxylate salt is selected from a Grou pIA alkali metal salt or clacium salt and is derived from a carboxylic acid containing 1 carboxyl group, and said epoxy resin comprises a glycidyl resin.

43. A composition as in claim 27 wherein said cure modifier is present in an amount of from about 1 to about 50 parts per hundred parts by weight of total epoxy resin, said metal carboxylate salt comprises sodium benzoate, sodium acetate, or calcium benzoate present in an amount of from about 1 to about 10 parts per hundred parts by weight of total epoxy resin, and said epoxy resin is selected from bisphenol A based epoxy resins or their brominated derivatives, epoxy novolacs, triglycidyl p-aminophenol, or tetraglycidyl methylenedianiline.

44. A composition as in claim 17 wherein said alcohol is monofunctional or difunctional and is selected from a benzyl, primary, or secondary alcohol, said metal carboxylate salt is selected from a Group IA alkali metal salt or calcium salt and is derived from a carboxylic acid containing 1 carboxyl group, and said epoxy resin comprises a glycidyl resin.

45. A composition as in claim 17 wherein said cure modifier is selected from an amide or a sulfonamide, said metal carboxylate salt is selected from a Group IA alkali metal salt or calcium salt and is derived from a carboxylic acid containing 1 carboxyl group, and said epoxy resin comprises a glycidyl resin.

46. A composition as in claim 16 wherein said cure modifier is selected from a quaternary ammonium or a phosphonium compound, said metal carboxylate salt is selected from a Group IA alkali metal salt or calcium salt and is derived from a carboxylic acid containing 1 carboxyl group, and said epoxy resin comprises a glycidyl resin.

47. A composition as in claim 16 wherein said cure modifier contains ether functionality, said metal carboxylate salt is selected from a Group IA alkali metal salt or calcium salt and is derived from a carboxylic acid containing 1 carboxyl group, and said epoxy resin comprises a glycidyl resin.

48. A composition as in claim 16 wherein said cure modifier contains cyanate ester functionality, said metal carboxylate salt is selected from a Group IA alkali metal salt or calcium salt and is derived from a carboxylic acid containing 1 carboxyl group, and said epoxy resin comprises a glycidyl resin.

49. A composition as in claim 16 wherein said cure modifier is selected from a sulfone or a sulfoxide, said metal carboxylate salt is selected from a Group IA alkali metal salt or calcium salt and is derived from a carboxylic acid containing 1 carboxyl group, and said epoxy resin comprises a glycidyl resin.

50. A composition as in claim 16 wherein said cure modifier contains lactone functionality, said metal carboxylate salt is selected from a Group IA alkali metal salt or calcium salt and is derived from a carboxylic acid containing 1 carboxyl group, and said epoxy resin comprises a glycidyl resin.

51. A process for curing a heat-curable epoxy resin composition that is free of cure-effective amounts of an amine, carboxylic anhydride, or carboxylic acid in the acid form, comprising mixing together
(a) at least one polyepoxide;
(b) from about 0.1 to about 50 parts of a metal carboxylate salt curing agent per hundred parts by weight of total epoxy resin, said metal carboxylate salt being selected from a Group IA or Group IIA metal and being derived from a carboxylic acid containing from 1 to 4 carboxyl groups, wherein said metal carboxylate salt is substantially soluble in said epoxy resin composition at the cure temperature of said composition; and
(c) from about 1 to about 100 parts of a cure modifier per hundred parts by weight of total epoxy resin, said cure modifier containing polar functionality, being soluble in said epoxy resin composition at said cure temperature and having sufficient solvating strength as to increase the solubility of said metal carboxylate salt in said epoxy resin to curing effective levels at said cure temperature; and heating said composition to a curing temperature of at least about 100° C.

* * * * *